United States Patent
Sales et al.

(10) Patent No.: US 11,213,929 B2
(45) Date of Patent: Jan. 4, 2022

(54) ABRASIVE ARTICLE AND METHOD FOR FORMING

(71) Applicants: SAINT-GOBAIN ABRASIVES, INC., Worcester, MA (US); SAINT-GOBAIN ABRASIFS, Conflans-Sainte-Honorine (FR)

(72) Inventors: Lenny C. Sales, Bradenton, FL (US); Trent Graham, Easley, SC (US); Lucie Fraichard, Boston, MA (US); Cecile O. Mejean, Acton, MA (US); Anton Cottrill, Cambridge, MA (US)

(73) Assignees: SAINT-GOBAIN ABRASSIVES, INC., Worcester, MA (US); SAINT-GOBAIN ABRASIFS

( * ) Notice: Subject to any disclaimer, the term of this patent is extended or adjusted under 35 U.S.C. 154(b) by 13 days.

(21) Appl. No.: 16/519,797

(22) Filed: Jul. 23, 2019

(65) Prior Publication Data
US 2020/0023494 A1 Jan. 23, 2020

Related U.S. Application Data

(60) Provisional application No. 62/702,063, filed on Jul. 23, 2018.

(51) Int. Cl.
*B24D 3/06* (2006.01)
*C09K 3/14* (2006.01)

(52) U.S. Cl.
CPC .............. *B24D 3/06* (2013.01); *C09K 3/1409* (2013.01); *C09K 3/1436* (2013.01); *C09K 3/1481* (2013.01)

(58) Field of Classification Search
CPC ...... B24D 3/06; C09K 3/1409; C09K 3/1436; C09K 3/1481
See application file for complete search history.

(56) References Cited

U.S. PATENT DOCUMENTS

| | | | |
|---|---|---|---|
| 4,018,576 A * | 4/1977 | Lowder | B23K 1/19 51/309 |
| 4,155,721 A | 5/1979 | Fletcher | |
| 5,178,643 A | 1/1993 | Schimweg | |
| 5,492,771 A | 2/1996 | Lowder | |
| 6,416,878 B2 | 7/2002 | An | |
| 2007/0151554 A1 | 7/2007 | Song | |

(Continued)

FOREIGN PATENT DOCUMENTS

| | | |
|---|---|---|
| EP | 2075092 A2 | 7/2009 |
| WO | 9952677 A1 | 10/1999 |
| WO | 2005039828 A1 | 5/2005 |

OTHER PUBLICATIONS https://vacaero.com/information-resources/vacuum-brazing-with-dan-kay/1493-electroless-nickel-plating-as-a-brazing-filler-metal.html, Jun. 7, 2016.

(Continued)

*Primary Examiner* — Pegah Parvini
(74) *Attorney, Agent, or Firm* — Abel Schillinger, LLP; Joseph P. Sullivan

(57) ABSTRACT

An abrasive article including a substrate, a first bonding material including metal overlying the substrate, abrasive particles overlying the substrate and coupled to the first bonding material, and a second bonding material including a metal and phosphorus overlying at least a portion of the first bonding material.

20 Claims, 8 Drawing Sheets

(56) References Cited

U.S. PATENT DOCUMENTS

2009/0165768 A1\* 7/2009 Kasashima .......... B23D 61/028
  125/15
2012/0055097 A1\* 3/2012 Tian .................... B23K 1/0056
  51/309
2014/0017985 A1\* 1/2014 Tian ...................... B28D 5/045
  451/533
2014/0308883 A1\* 10/2014 Sung .................... B24B 53/017
  451/443
2014/0311472 A1 10/2014 Tian et al.
2015/0004890 A1\* 1/2015 Krstic ................ C23C 18/1635
  451/533
2015/0290771 A1 10/2015 Li

OTHER PUBLICATIONS

International Search Report and Written Opinion dated Nov. 7, 2019, with regard to International Application No. PCT.US2019/043007.

\* cited by examiner

ABRASIVE ARTICLE AND METHOD FOR FORMING

CROSS-REFERENCE TO RELATED APPLICATION

This application claims priority under 35 U.S.C. § 119(e) to U.S. Provisional Application No. 62/702,063, entitled "ABRASIVE ARTICLE AND METHOD FOR FORMING," by Lenny C. Sales et al., filed Jul. 23, 2018, which is assigned to the current assignee hereof and is incorporated herein by reference in its entirety.

BACKGROUND

Field of the Disclosure

The following is directed to an abrasive article, and particularly, to an abrasive article including a first bonding material and a second bonding material.

Description of the Related Art

Abrasive articles, such as abrasive wheels, can be used for cutting, grinding, or shaping various materials. The industry continues to demand improved abrasive articles having improved capabilities.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following description in combination with the figures is provided to assist in understanding the teachings provided herein. The following disclosure will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

The following is directed to abrasive articles suitable for use in material removal operations. Notably, the abrasive articles of the embodiments herein may be suitable for use in foundry applications, including cutting and grinding of metal materials.

Figure 1:
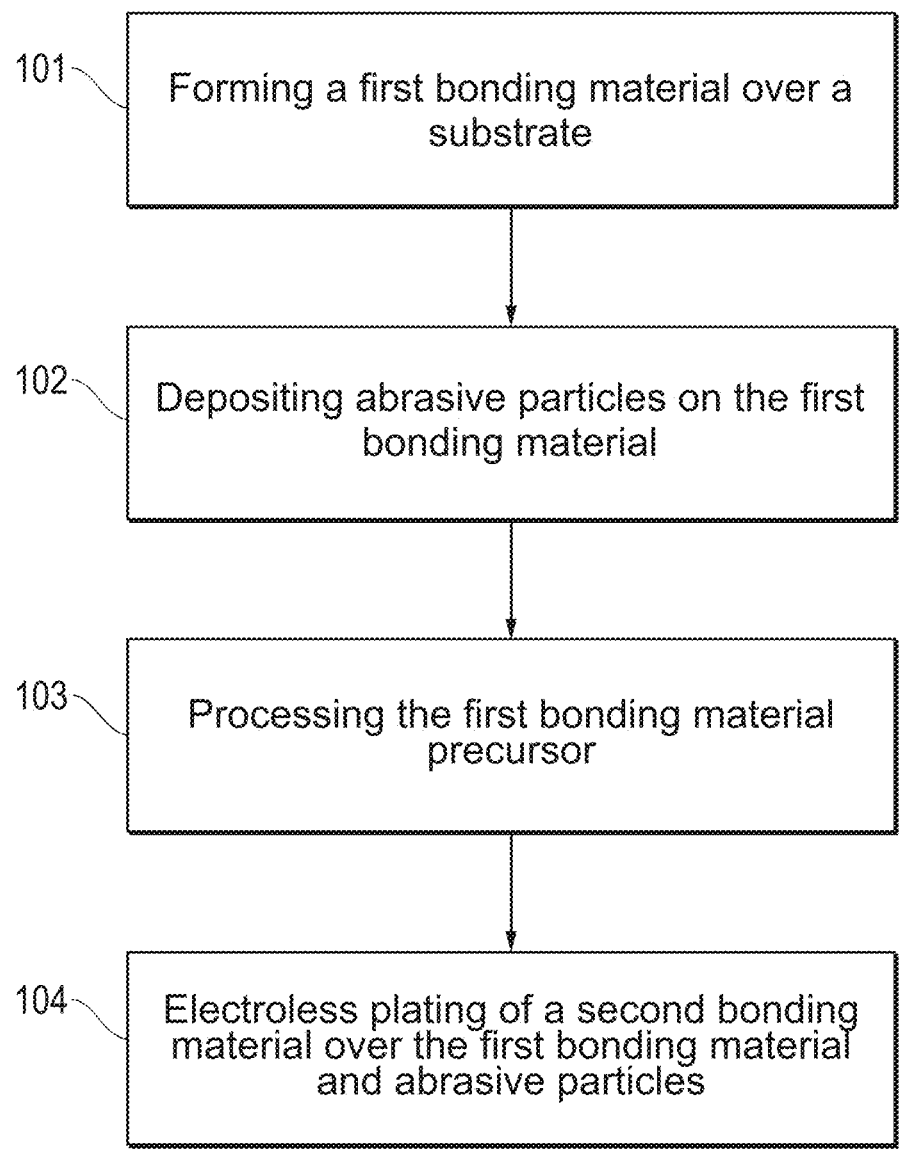
FIG. 1 includes a flow chart illustrating a process of forming an abrasive article according to an embodiment.

FIG. 1 includes a flow chart providing a process for forming an abrasive article according to an embodiment. The process begins at step 101 by forming a first bonding material over a substrate. The substrate may include an inorganic material, such as metal or metal alloy. In one particular embodiment, the substrate can consist of a metal or metal alloy. The substrate may have any suitable shape for containing abrasive particles thereon, including but not limited to, a disk, a wire, a rod, or even a substrate having a complex shape with multiple different curvatures.

The first bonding material can be formed from a first bonding precursor mixture that may be deposited on the substrate. The first bonding precursor mixture can be a dry mixture or wet mixture. The first bonding precursor mixture may be in the form of a slurry, a paste, a tape, or the like. The first bonding precursor mixture may be deposited selectively on certain portions of the substrate where the abrasive particles are desired in the finally-formed abrasive article. The first bonding precursor mixture may be in the form of a single, continuous layer of material overlying one or more surfaces of the substrate. In an alternative embodiment, the first bonding precursor mixture may be deposited in a plurality of discrete regions separated by gaps where the underlying substrate is exposed and free of the first bonding precursor mixture. The plurality of discrete regions may define a discontinuous layer of the first bonding precursor mixture.

The first bonding precursor mixture may include a mixture of one or more powders contained in a liquid vehicle. The one or more powders may include particulates of metal or metal alloys suitable for forming the intended composition of the finally-formed first bonding material. The liquid vehicle may be an organic or inorganic material suitable for properly containing the one or more powders in the mixture. In at least one embodiment, the liquid vehicle may include a binder, such as a water-based organic binder, for example, an alkaline gel including a xantham gum, a galactomannan gum, glycerin, tripropylene glycol, a synthetic polymer, or any combination thereof.

In one embodiment, the first bonding precursor material can include at least one transition metal element. For example, the first bonding precursor material can include at least one metal selected from the group consisting of copper, tin, silver, tungsten, iron, titanium, nickel, chrome, or any combination thereof. In one particular embodiment, the first bonding precursor material can include a powder material including tin, copper, and titanium. The powder material can include a single prealloyed particulate including tin, copper, and titanium. Alternatively, the powder material can include three different powders of tin, copper, and titanium mixed together in the desired amounts. In one particular embodiment, the first bonding precursor material can be a braze. In one aspect, the first bonding precursor material can be a brazing paste comprising a prealloyed copper-tin powder and a titanium hydride powder. Details regarding aspects of the finally-formed first bonding material are provided in more detail herein.

After depositing the first bonding material on the substrate at step 101, the process can continue at step 102 by depositing abrasive particles on the first bonding material. The abrasive particles may include an oxide, a carbide, a nitride, a boride, a superabrasive or any combination thereof. In one embodiment the abrasive particles may include a superabrasive material, for example, diamond particles or cubic boron nitride particles. In a more particular embodiment, the abrasive particles may consist essentially of diamond.

The abrasive particles may have a certain size that can facilitate use of the abrasive article in certain applications. Moreover, the average size of the diamonds may be related to the first and second bonding materials, such that a suitable bond is created to contain larger-sized abrasive particles. In one embodiment, the abrasive particles may have an average particle size (D50) of at least 500 microns, such as at least 525 microns or at least 550 microns or at least 575 microns or at least 600 microns or at least 625 microns or at least 650 microns or at least 675 microns or at least 700 microns, or at least 750 microns, or at least 800 microns. Still, in another non-limiting embodiment, the abrasive particles may have an average particle size (D50) of not greater than 5 mm or not greater than 4 mm or not greater than 3 mm or not greater than 2 mm or not greater than 1.5 mm, or not greater than 1.2 mm, or not greater than 1.0 mm. The abrasive particles may have an average particle size (D50) within a range including any of the minimum and maximum values noted above.

The first bonding material precursor may include one or more fillers. The filler can be an optional additive included during the deposition of the abrasive particles. Alternatively, the filler can be included in the mixture of the first bonding material precursor. The filler can be a particulate, a fiber, an inorganic material, or a combination thereof. In one instance, the filler can include a wear resistant particle. In another embodiment, the filler can include a material selected from the group consisting of tungsten, iron, titanium, diamond, a carbide, a nitride, a boride, an oxide, or any combination thereof.

The filler may have a particular average particles size relative to the average particle size of the abrasive particles. For example, the filler can have an average particle size (D50f) that is less than the average particle size (D50) of the abrasive particles. More particularly, the filler and abrasive particles may have a certain relationship to each other, which may be defined as a ratio [(D50f)/(D50)]. In at least one instance, the ratio [(D50f)/(D50)] can be not greater than 0.99, such as not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.08 or not greater than 0.05 or not greater than 0.02. Still, in one non-limiting embodiment, the ratio [(D50f)/(D50)] can be at least 0.005 or at least 0.008 or at least 0.01 or at least 0.012 or at least 0.015 or at least 0.018 or at least 0.02 or at least 0.025 or at least 0.03 or at least 0.035 or at least 0.04 or at least 0.05 or at least 0.06 or at least 0.07 or at least 0.08 or at least 0.09 or at least 0.1 or at least 0.15 or at least 0.2 or at least 0.25. The ratio [(D50f)/(D50)] can be within a range including any of the minimum and maximum values noted above.

According to one aspect, the filler can have an average particle size (D50f) of not greater than 10 microns, such as not greater than 8 microns or not greater than 6 microns or not greater than 4 microns or not greater than 2 microns or not greater than 1 micron or not greater than 0.8 microns or not greater than 0.5 microns. In other instances, the filler can have an average particle size (D50f) of at least 0.01 microns or at least 0.05 microns or at least 0.08 microns or at least 0.1 micron or at least 0.2 microns or at least 0.5 microns or at least 0.8 microns or at least 1 micron or at least 2 microns or at least 3 microns or at least 5 microns. The average particle size of the filler (D50f) can be within a range including any of the minimum and maximum values noted above.

After depositing the abrasive particles on the first bonding material precursor at step 102, the process can continue at step 103 by processing the first bonding material precursor. Processing of the first bonding material precursor can include drying, heating, melting or any combination thereof.

For example, in one embodiment, processing can include drying the first bonding material precursor. Drying may be conducted in a humidity-controlled environment for a duration of between 1 to 24 hours. Drying may be conducted at a temperature above room temperature but below the melting temperature of the first bonding material precursor.

In one embodiment, processing may include treating the first bonding material precursor at a suitable temperature to facilitate melting of the first bonding material precursor to a state that flows around the abrasive particles and secures them to the substrate. Such a treatment may be conducted after an optional drying process. In one embodiment, processing can include brazing the first bonding material precursor comprising a braze to the substrate. The brazing process can utilize a braze temperature to suitably melt the braze material and secure the abrasive particles in the braze and to the substrate. For example, a suitable braze temperature can be at least 680° C., or at least 700° C., or at least 720° C., or at least 750° C. In another non-limiting embodiment, the braze temperature can be not greater than 1000°

C., such as not greater than 950° C., not greater than 900° C., not greater than 880° C., or not greater than 850° C. It will be appreciated that the braze temperature can be within a range including any of the minimum and maximum values noted above.

It will be understood that reference to a braze temperature is reference to the maximum temperature used to flow the first bonding material precursor around the abrasive particles. Certain embodiments may not necessarily use a braze material, but the braze temperature may still represent the maximum temperature used to form the first bonding material precursor into the first bonding material.

Processing of the first bonding material precursor to form the first bonding material can be conducted in a particular atmosphere. For example, processing can be conducted in an inert atmosphere or non-oxidizing atmosphere that can contain a suitable amount of a gas such as argon, nitrogen, under vacuum, or the like.

After processing the first bonding material precursor at step 103 the process can continue at step 104 with electroless plating of a second bonding material over the first bonding material and abrasive particles. According to one embodiment, electroless plating can include applying a second bonding material as a layer via electroless plating. Electroless plating can include the position of metals such as nickel, platinum, gold, chrome, copper, silver, rhodium, zinc, tin, or cadmium. In one aspect, the second bond material can be a nickel-phosphorous or nickel-boron alloy.

After completing the process at step 104, an abrasive article is formed. According to one aspect, the abrasive article can include a substrate, a first bonding material comprising metal overlying the substrate, abrasive particles overlying the substrate and coupled to the first bonding material, and a second bonding material comprising a metal and phosphorus overlying the abrasive particles and first bonding material. In another aspect, the abrasive article can include a substrate, a first bonding material comprising metal overlying the substrate, abrasive particles overlying the substrate and coupled to the first bonding material, wherein the abrasive particles have an average particle size of at least 500 microns, and a second bonding material comprising a metal and overlying the abrasive particles and first bonding material. In still another aspect, the abrasive article may include a substrate, a first bonding material comprising a braze overlying the substrate, abrasive particles overlying the substrate and coupled to the first bonding material, and a second bonding material comprising an electroless plated material and overlying the abrasive particles and first bonding material.

Figure 2A:
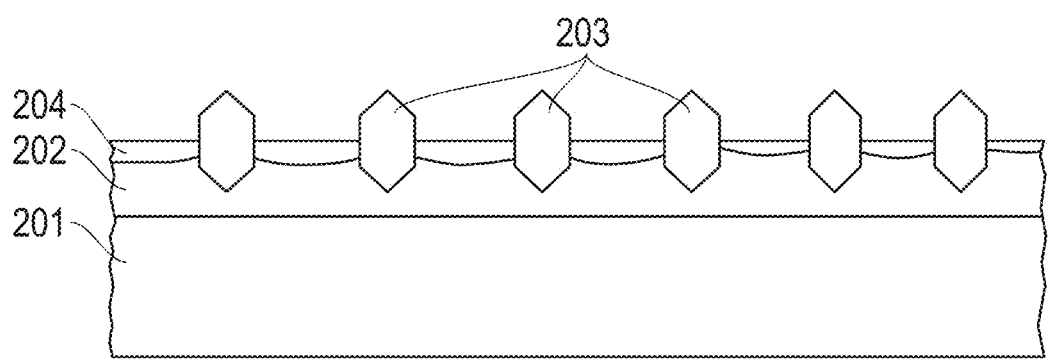
FIG. 2A includes an illustration of a cross-sectional illustration of a portion of an abrasive article according to an embodiment.

FIG. 2A includes a cross-sectional illustration of an abrasive article according to an embodiment. As illustrated, the abrasive article 200 includes a substrate 201, a first bonding material 202 overlying at least a portion of the substrate 201, abrasive particles 203 contained in the first bonding material, and a second bonding material 204 overlying at least portions of the first bonding material 202. The second bonding material 204 may be overlying at least a portion of the first bonding material 202 and at least a portion of the abrasive particles 203.

The substrate 201 can have any of the features of the embodiments described herein. While FIG. 2A includes a cross-sectional illustration demonstrating the attachment of the first bonding material 202 and the abrasive particles 203 to a planar surface, it will be understood that the first bonding material 202 may be applied to a curved surface of a substrate 201.

As illustrated in FIG. 2A, the first bonding layer 202 can be in the form of a continuous layer of material overlying at least a portion of the substrate 201. The first bonding layer 202 can be directly attached to an exterior surface of the substrate 201. According to one embodiment, the first bonding layer 202 can overlie at least 50% of the exterior surface of the substrate 201, such as at least 60% or at least 70% or at least 80% or at least 90% of the exterior surface of the substrate 201. In a particular embodiment, the first bonding layer 202 can be a single, continuous layer overlying essentially all of the exterior surface of the substrate 201.

The first bonding material 202 can be formed from the first bonding material precursor and include the composition of the first bonding material precursor as defined in embodiments herein. For example, the first bonding material 202 can include a metal or metal alloy. The first bonding material 202 may include at least one transition metal element. In certain instances, the first bonding material 202 can include at least one metal selected from the group of copper, tin, silver, tungsten, iron, titanium, nickel, chrome, or any combination thereof. In one embodiment, the first bonding material 202 may include tin, copper, and titanium, and in more specific embodiments, may consist essentially of tin, copper, and titanium. According to a particular example, the first bonding material is a braze.

According to one embodiment, the first bonding material 202 can include a ratio [C(Sn)/C(Cu)] of at least 0.1, wherein C(Sn) is the weight percent of the tin for a total weight of the first bonding material 202 and C(Cu) is the weight percent of copper for a total weight of the first bonding material 202. For example, the ratio [C(Sn)/C(Cu)] can be at least 0.13 or at least 0.15 or at least 0.18 or at least 0.2 or at least 0.23 or at least 0.25 or at least 0.28 or at least 0.3 or at least 0.33 or at least 0.35 or at least 0.38 or at least 0.4 or at least 0.43 or at least 0.45 or at least 0.48 or at least 0.5 or at least 0.53. Still, in another embodiment, the ratio [C(Sn)/C(Cu)] can be not greater than 1, such as not greater than 0.9 or not greater than 0.8 or not greater than 0.7 or not greater than 0.6 or not greater than 0.5 or not greater than 0.4 or not greater than 0.35 or not greater than 0.3 or not greater than 0.25. It will be appreciated that the ratio [C(Sn)/C(Cu)] can be within a range including any of the minimum and maximum values noted above.

In another embodiment, the first bonding material 202 may have a particular ratio [C(Ti)/C(Sn)] of at least 0.1, wherein C(Ti) is the weight percent of titanium for a total weight of the first bonding material 202 and C(Sn) is the weight percent of tin for a total weight of the first bonding material 202. For example, the ratio [C(Ti)/C(Sn)] can be at least 0.13, such as at least 0.15 or at least 0.18 or at least 0.2 or at least 0.23 or at least 0.25 or at least 0.28 or at least 0.3 or at least 0.33 or at least 0.35 or at least 0.38 or at least 0.4 or at least 0.43 or at least 0.45 or at least 0.48 or at least 0.5 or at least 0.53 or at least 0.55 or at least 0.6 or at least 0.65 or at least 0.7 or at least 0.75 or at least 0.8 or at least 0.9. Still, in one non-limiting embodiment, the ratio [C(Ti)/C(Sn)] can be not greater than 1, such as not greater than 0.9 or not greater than 0.8 or not greater than 0.7 or not greater than 0.6 or not greater than 0.5 or not greater than 0.4 or not greater than 0.35 or not greater than 0.3 or not greater than 0.25. It will be appreciated that the ratio [C(Ti)/C(Sn)] can be within a range including any of the minimum and maximum values noted above.

In yet another aspect, the first bonding material 202 can have a ratio [C(Ti)/C(Cu)] of at least 0.01, wherein C(Ti) is the weight percent of titanium for a total weight of the first bonding material 202 and C(Cu) is the weight percent of copper for a total weight of the first bonding material 202. For example, the ratio [C(Ti)/C(Cu)] can be at least 0.02, such as at least 0.05 or at least 0.08 or at least 0.1 or at least 0.12 or at least 0.15 or at least 0.18 or at least 0.2 or at least 0.25 or at least 0.3. Still, in another non-limiting embodiment, the ratio [C(Ti)/C(Cu)] can be not greater than 1, such as not greater than 0.9 or not greater than 0.8 or not greater than 0.7 or not greater than 0.6 or not greater than 0.5 or not greater than 0.4 or not greater than 0.35 or not greater than 0.3 or not greater than 0.25 or not greater than 0.2 or not greater than 0.18 or not greater than 0.15 or not greater than 0.12 or not greater than 0.1. It will be appreciated that the ratio [C(Ti)/C(Cu)] can be within a range including any of the minimum and maximum values noted above.

In another embodiment, the first bonding material 202 may include a particular content of copper that may facilitate improved formation and performance. For example, the first bonding material 202 can have a content of copper of at least 30 wt % for a total weight of the first bonding material 202, such as at least 40 wt % or at least 50 wt % or at least 60 wt % or at least 70 wt % or at least 80 wt %. Still, in another non-limiting embodiment, the first bonding material 202 can have a content of copper of not greater than 99 wt % for a total weight of the first bonding material 202, such as not greater than 95 wt % or not greater than 93 wt % or not greater than 90 wt % or not greater than 85 wt % or not greater than 80 wt % or not greater than 75 wt % or not greater than 70 wt % or not greater than 65 wt % or not greater than 60 wt % or not greater than 55 wt %. It will be appreciated that the content of copper in the first bonding material 202 can be within a range including any of the minimum and maximum values noted above.

In another embodiment, the first bonding material 202 may include a particular content of tin that may facilitate improved formation and performance. For example, the first bonding material 202 can have a content of tin of at least 5 wt % for a total weight of the first bonding material 202, such as at least 8 wt % or at least 10 wt % or at least 12 wt % or at least 15 wt % or at least 18 wt % or at least 20 wt % or at least 22 wt % or at least 25 wt % or at least 27 wt % or at least 30 wt %. Still, in another non-limiting embodiment, the first bonding material 202 can have a content of tin of not greater than 50 wt % for a total weight of the first bonding material 202, such as not greater than 40 wt % or not greater than 35 wt % or not greater than 30 wt % or not greater than 28 wt % or not greater than 25 wt % or not greater than 22 wt % or not greater than 20 wt % or not greater than 18 wt % or not greater than 15 wt % or not greater than 12 wt %. It will be appreciated that the content of tin in the first bonding material 202 can be within a range including any of the minimum and maximum values noted above.

In another embodiment, the first bonding material 202 may include a particular content of titanium that may facilitate improved formation and performance. For example, the first bonding material 202 can have a content of titanium of at least 0.5 wt % for a total weight of the first bonding material 202 or at least 0.8 wt % or at least 1 wt % or at least 2 wt % or at least 6 wt % or at least 8 wt % or at least 10 wt % or at least 12 wt % or at least 15 wt % or at least 18 wt % or at least 20 wt %. Still, in another non-limiting embodiment, the first bonding material 202 can have a content of titanium of not greater than 30 wt % for a total weight of the first bonding material 202, such as not greater than 20 wt % or not greater than 18 wt % or not greater than 15 wt % or not greater than 12 wt % or not greater than 10 wt % or not greater than 8 wt % or not greater than 6 wt %. It will be appreciated that the content of titanium in the first bonding material 202 can be within a range including any of the minimum and maximum values noted above.

The abrasive particles 203 of the finally-formed abrasive article 200 can have any of the features of embodiments herein, including but not limited to, average particle size (D50), composition, relative size to the filler, and the like. In particular, the first bonding material 202 may have a particular average thickness relative to the average particle size of the abrasive particles 203, which may facilitate improved formation and operation of the abrasive article 200. For example, the first bonding material 202 may have an average thickness of not greater than 50% of the average particles size (D50) of the abrasive particles 203, such as not greater than 45% or not greater than 40% or not greater than 35% or not greater than 30% or not greater than 25% or not greater than 20% or not greater than 10% of the average particles size (D50) of the abrasive particles 203. Still, in one non-limiting embodiment, the first bonding material 202 may have an average thickness of at least 10% of the average particles size (D50) of the abrasive particles 203, such as at least 20% or at least 30% or at least 40% or at least 50% of the average particles size (D50) of the abrasive particles 203. The average thickness of the first bonding material 202 can be measured by taking at least three randomly selected optical microscope images at a suitable magnification (e.g., 50X). The area of the first bonding material 202 in each image can be evaluated using a suitable imaging analysis program, such as ImageJ. The total area of the first bonding material 202 is divided by the length of the first bonding material in the image to calculate the average thickness of the first bonding material 202.

It will be appreciated that the filler described in embodiments herein may be optionally included in the first bonding material 202 or second bonding material 204 or both the first bonding material 202 and the second bonding material 204.

As noted in embodiments herein, the second bonding material 204 can be an electroless plated material. According to one embodiment, the second bonding material 204 can be in the form of a thin, conformal layer overlying portions of the first bonding material 202 and portions of the abrasive particles 203. The second bonding material 204 may not completely bury the majority of the tips of the abrasive particles 203, such that there is sufficient exposure of the abrasive particles 203 above the upper surface of the second bonding material 204 for suitable abrasive capabilities.

According to one embodiment, the second bonding material 204 can include at least one metal element and phosphorus. The second bonding material 204 may have a particular content of phosphorus that facilitates improved formation and operation of the abrasive article. For example, the second bonding material 204 can have a content of phosphorus of not greater than 10 wt % for a total weight of the second bonding material 204 or not greater than 9 wt % or not greater than 8 wt % or not greater than 7 wt % or not greater than 6 wt % or not greater than 5 wt % or not greater than 4 wt % or not greater than 3 wt % or not greater than 2 wt % or not greater than 1 wt % for a total weight of the second bonding material 204. In another non-limiting embodiment, the second bonding material 204 may have a content of phosphorus of at least 0.1 wt % for a total weight of the second bonding material 204, such as at least 1 wt % or at least 2 wt % or at least 3 wt % or at least 4 wt % or at least 5 wt % or at least 6 wt % or at least 7 wt % or at least 8 wt %. In a particular embodiment, the phosphorus content can be at least 5 wt % and not greater than 9 wt %. The content of phosphorus in the second bonding material 204 can be within a range including any of the minimum and maximum values noted above.

The at least one metal element of the second bonding material 204 may include at least one transition metal element. For example, the second bonding material 204 may include nickel. In more particular instances, the second bonding material 204 may include a certain content of nickel that may facilitate improved formation and performance of the abrasive article. In certain instance, the second bonding material 204 may include at least 50 wt % nickel for a total weight of the second bonding material 204, such as at least 60 wt % or at least 70 wt % or at least 80 wt % or at least 90 wt % or at least 95 wt % for a total weight of the second bonding material 204. According to another non-limiting embodiment, the second bonding material 204 may include not greater than 99 wt % nickel for a total weight of the second bonding material 204, such as not greater than 95 wt % or not greater than 93 wt % or not greater than 90 wt % for a total weight of the second bonding material 204. The content of nickel in the second bonding material 204 can be within a range including any of the minimum and maximum values noted above.

According to another aspect, the second bonding material 204 may have a particular average thickness relative to the first bonding material 202, which may facilitate improved formation and operation of the abrasive article 200. For example, the second bonding material 204 can have an average thickness not greater than an average thickness of the first bonding material 202.

In other instances, the second bonding material 204 may have a particular average thickness relative to the average particle size (D50) of the abrasive particles 203, which may facilitate improved formation and operation of the abrasive article 200. For example, the second bonding material 204 may have an average thickness of not greater than 40% of the average particles size (D50) of the abrasive particles, such as not greater than 35% or not greater than 30% or not greater than 25% or not greater than 20% or not greater than 15% or not greater than 12% or not greater than 10% of the average particles size (D50) of the abrasive particles 203. Still, in one non-limiting embodiment, the second bonding material 204 may have an average thickness of at least 1% of the average particles size (D50) of the abrasive particles 203, such as at least 3%, or at least 5%, or at least 8%, or at least 10%, or at least 15%, or at least 20%, or at least 25%, or at least 30% of the average particles size (D50) of the abrasive particles 203. The average thickness of the second bonding material 204 can be measured by taking at least three randomly selected optical microscope images at a suitable magnification (e.g., 50$\chi$). The area of the second bonding material 204 in each image can be evaluated using a suitable imaging analysis program, such as ImageJ. The total area of the second bonding material 204 is divided by the length of the second bonding material 204 in the image to calculate the average thickness of the second bonding material 204.

In one embodiment, the average thickness of the second bonding material can be at least 10 microns, such as at least 15 microns, at least 20 microns, at least 30 microns, at least 40 microns, or at least 50 microns. In another embodiment, the average thickness of the second bonding material may be not greater than 500 microns, such as not greater than 300 microns, or not greater than 250 microns, or not greater than 200 microns, or not greater than 150 microns, or not greater than 100 microns, or not greater than 80 microns, or not greater than 60 microns, or not greater than 50 microns, or not greater than 40 microns, or not greater than 35 microns. The average thickness of the second bonding material can be within a range including any of the minimum and maximum values noted above. In a particular embodiment, the thickness of the EN layer can be at least 20 microns and not greater than 55 microns.

The average total thickness of the bonding materials can be calculated from the sum of the average thickness of the first bonding material 202 and the average thickness of the second bonding material 204. The average total thickness may have a certain relationship relative to the average particle size (D50) of the abrasive particles that can facilitate improved formation and operation of the abrasive article. For example, the average total thickness of the combined first and second bonding materials may be not greater than 80% of the average particles size (D50) of the abrasive particles 203, such as not greater than 75% or not greater than 70% or not greater than 65% or not greater than 60% or not greater than 55% or not greater than 50%, or not greater than 47%, or not greater than 45% of the average particles size (D50) of the abrasive particles 203. Still, in one embodiment, the average total thickness can be at least 30% of the average particles size (D50) of the abrasive particles, such as at least 40% or at least 50% or at least 60% or at least 70% of the average particles size (D50) of the abrasive particles 203. In a particular aspect, the average total thickness of the combined bonding materials can be at least 30% and not greater than 50% based on the average particle size (D50) of the abrasive particles. The average total thickness of the bonding materials may be within a range including any of the minimum and maximum percentages noted above.

In one particular embodiment, the average total thickness of the sum of the first and second bonding materials may be not greater than 500 microns or not greater than 450 microns or not greater than 400 microns or not greater than 350 microns or not greater than 300 microns or not greater than 250 microns. According to another non-limiting embodiment, the average total thickness of the bonding materials can be at least 100 microns or at least 200 microns or at least 250 microns or at least 300 microns or at least 350 microns. The average total thickness of the bonding materials may be within a range including any of the minimum and maximum values noted above.

In a particular embodiment, the second bonding material can be an electroless plated nickel layer having a Vickers hardness of at least 5.50 GPa, such as at least 5.8 GPa, or at least 6.0 GPa, or at least 6.2 GPa, or at least 6.4 GPa, or at least 6.5 GPa.

In a further certain embodiment, the second bonding material can be an electroless plated nickel layer having a thickness of at least 10 microns and not greater than 60 microns and a Vickers hardness of at least 6 GPa.

Figure 2B:
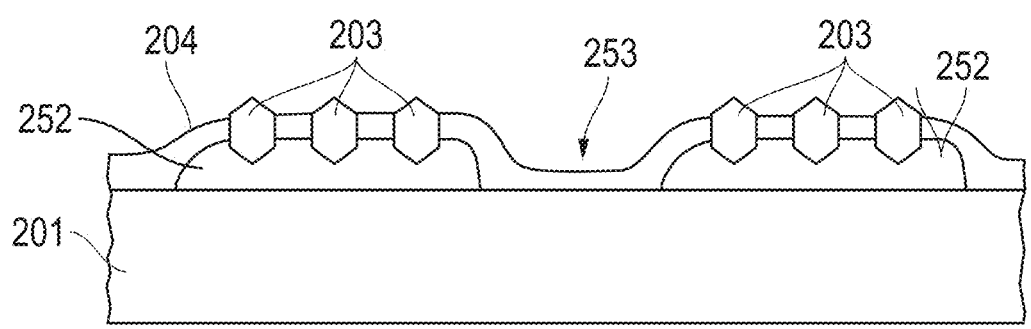
FIG. 2B includes an illustration or a cross-sectional illustration of a portion of an abrasive article according to another embodiment.

FIG. 2B includes a cross-sectional illustration of an abrasive article according to an alternative embodiment. As illustrated, the abrasive article 250 includes a substrate 201, a first bonding material 252 overlying at least a portion of the substrate 201, abrasive particles 203 contained in the first bonding material 252, and a second bonding material 204 overlying at least portions of the first bonding material 252. The second bonding material 204 may be overlying at least a portion of the first bonding material 252 and at least a portion of the abrasive particles 203. Notably, the first bonding material 252 can be a discontinuous layer having discrete regions of the first bonding material 252 separated by gap regions 253. The gap regions 253 can be free of the first bonding material 252 and abrasive particles 203. The gap regions 253 may optionally include the second bonding material 204 in direct contact with the substrate 201. However, it will be appreciated in certain instances, the gap regions 253 may be free of any bonding material and define a region where the substrate 201 is exposed.

As further shown in the examples, abrasive articles with a surprisingly high life time and grinding performance could be produced by attaching diamond particles via a first bonding layer to a steel support and covering the first bonding layer and diamond particles with a thin electroless plated nickel layer. Not being bound to theory, reasons for the exceptional grinding performance can be a strong bonding of the diamond particles to the support by the combination of the two bonding layers, which may allow a high grain exposure for the grinding operation. The electroless nickel (EN) layer can very evenly be applied on top of the first bonding layer and the abrasive particles, and the EN layer can provide an excellent heat shielding and oxidation protection with a thickness of about only 50 microns or lower.

EMBODIMENTS

Embodiment 1

An abrasive article comprising: a substrate; a first bonding material comprising metal overlying the substrate; abrasive particles overlying the substrate and coupled to the first bonding material; and a second bonding material comprising a metal and phosphorus overlying at least a portion of the first bonding material.

Embodiment 2

An abrasive article comprising: a substrate; a first bonding material comprising metal overlying the substrate; abrasive particles overlying the substrate and coupled to the first bonding material, wherein the abrasive particles have an average particle size of at least 500 microns; and a second bonding material comprising a metal and overlying at least a portion of the first bonding material.

Embodiment 3

An abrasive article comprising: a substrate; a first bonding material comprising a braze overlying the substrate; abrasive particles overlying the substrate and coupled to the first bonding material; and a second bonding material comprising an electroless plated material and overlying at least a portion of the first bonding material.

Embodiment 4

The abrasive article of any one of Embodiments 1, 2, and 3, wherein the substrate comprises an inorganic material.

Embodiment 5

The abrasive article of any one of Embodiments 1, 2, and 3, wherein the substrate comprises a metal or metal alloy.

Embodiment 6

The abrasive article of any one of Embodiments 1, 2, and 3, wherein the substrate consists of a metal or metal alloy.

Embodiment 7

The abrasive article of any one of Embodiments 1, 2, and 3, wherein the first bonding material is in the form of a layer overlying an exterior surface of the substrate.

Embodiment 8

The abrasive article of any one of Embodiments 1, 2, and 3, wherein the first bonding material overlies at least 50% of the exterior surface of the substrate or at least 60% or at least 70% or at least 80% or at least 90%.

Embodiment 9

The abrasive article of any one of Embodiments 1, 2, and 3, wherein the first bonding material is a single, continuous layer overlying essentially all of the exterior surface of the substrate.

Embodiment 10

The abrasive article of any one of Embodiments 1, 2, and 3, wherein the first bonding material comprises a metal alloy.

Embodiment 11

The abrasive article of any one of Embodiments 1, 2, and 3, wherein the first bonding material comprises at least one transition metal element.

Embodiment 12

The abrasive article of any one of Embodiments 1, 2, and 3, wherein the first bonding material comprises at least one metal selected from the group consisting of copper, tin, silver, tungsten, iron, titanium, nickel, chrome, or any combination thereof.

Embodiment 13

The abrasive article of any one of Embodiments 1, 2, and 3, wherein the first bonding material comprises tin, copper, and titanium.

Embodiment 14

The abrasive article of Embodiment 13, wherein the first bonding material comprises a ratio [C(Sn)/C(Cu)] of at least 0.1, wherein C(Sn) is the weight percent of the tin for a total weight of the first bonding material and C(Cu) is the weight percent of copper for a total weight of the first bonding material, wherein the ratio [C(Sn)/C(Cu)] is at least 0.13 or at least 0.15 or at least 0.18 or at least 0.2 or at least 0.23 or at least 0.25 or at least 0.28 or at least 0.3 or at least 0.33 or at least 0.35 or at least 0.38 or at least 0.4 or at least 0.43 or at least 0.45 or at least 0.48 or at least 0.5 or at least 0.53.

Embodiment 15

The abrasive article of Embodiment 13, wherein the first bonding material comprises a ratio [C(Sn)/C(Cu)] of not greater than 1 or not greater than 0.9 or not greater than 0.8 or not greater than 0.7 or not greater than 0.6 or not greater than 0.5 or not greater than 0.4 or not greater than 0.35 or not greater than 0.3 or not greater than 0.25.

Embodiment 16

The abrasive article of Embodiment 13, wherein the first bonding material comprises a ratio [C(Ti)/C(Sn)] of at least 0.1, wherein C(Ti) is the weight percent of titanium for a total weight of the first bonding material and C(Sn) is the weight percent of tin for a total weight of the first bonding material, wherein the ratio [C(Ti)/C(Sn)] is at least 0.13 or at least 0.15 or at least 0.18 or at least 0.2 or at least 0.23 or at least 0.25 or at least 0.28 or at least 0.3 or at least 0.33 or at least 0.35 or at least 0.38 or at least 0.4 or at least 0.43 or at least 0.45 or at least 0.48 or at least 0.5 or at least 0.53 or at least 0.55 or at least 0.6 or at least 0.65 or at least 0.7 or at least 0.75 or at least 0.8 or at least 0.9.

Embodiment 17

The abrasive article of Embodiment 13, wherein the first bonding material comprises a ratio [C(Ti)/C(Sn)] of not greater than 1 or not greater than 0.9 or not greater than 0.8 or not greater than 0.7 or not greater than 0.6 or not greater than 0.5 or not greater than 0.4 or not greater than 0.35 or not greater than 0.3 or not greater than 0.25.

Embodiment 18

The abrasive article of Embodiment 13, wherein the first bonding material comprises a ratio [C(Ti)/C(Cu)] of at least 0.01, wherein C(Ti) is the weight percent of titanium for a total weight of the first bonding material and C(Cu) is the weight percent of copper for a total weight of the first bonding material, wherein the ratio [C(Ti)/C(Cu)] is at least 0.02 or at least 0.05 or at least 0.08 or at least 0.1 or at least 0.12 or at least 0.15 or at least 0.18 or at least 0.2 or at least 0.25 or at least 0.3.

Embodiment 19

The abrasive article of Embodiment 13, wherein the first bonding material comprises a ratio [C(Ti)/C(Cu)] of not greater than 1 or not greater than 0.9 or not greater than 0.8 or not greater than 0.7 or not greater than 0.6 or not greater than 0.5 or not greater than 0.4 or not greater than 0.35 or not greater than 0.3 or not greater than 0.25 or not greater than 0.2 or not greater than 0.18 or not greater than 0.15 or not greater than 0.12 or not greater than 0.1.

Embodiment 20

The abrasive article of Embodiment 13, wherein the first bonding material comprises a content of copper of at least 30 wt % for a total weight of the first bonding material or at least 40 wt % or at least 50 wt % or at least 60 wt % or at least 70 wt % or at least 80 wt %.

Embodiment 21

The abrasive article of Embodiment 13, wherein the first bonding material comprises a content of copper of not greater than 99 wt % for a total weight of the first bonding material or not greater than 95 wt % or not greater than 93 wt % or not greater than 90 wt % or not greater than 85 wt % or not greater than 80 wt % or not greater than 75 wt % or not greater than 70 wt % or not greater than 65 wt % or not greater than 60 wt % or not greater than 55 wt %.

Embodiment 22

The abrasive article of Embodiment 13, wherein the first bonding material comprises a content of tin of at least 5 wt % for a total weight of the first bonding material or at least 8 wt % or at least 10 wt % or at least 12 wt % or at least 15 wt % or at least 18 wt % or at least 20 wt % or at least 22 wt % or at least 25 wt % or at least 27 wt % or at least 30 wt %.

Embodiment 23

The abrasive article of Embodiment 13, wherein the first bonding material comprises a content of tin of not greater than 50 wt % for a total weight of the first bonding material or not greater than 40 wt % or not greater than 35 wt % or not greater than 30 wt % or not greater than 28 wt % or not greater than 25 wt % or not greater than 22 wt % or not greater than 20 wt % or not greater than 18 wt % or not greater than 15 wt % or not greater than 12 wt %.

Embodiment 24

The abrasive article of Embodiment 13, wherein the first bonding material comprises a content of titanium of at least 0.5 wt % for a total weight of the first bonding material or at least 0.8 wt % or at least 1 wt % or at least 2 wt % or at least 6 wt % or at least 8 wt % or at least 10 wt % or at least 12 wt % or at least 15 wt % or at least 18 wt % or at least 20 wt %.

Embodiment 25

The abrasive article of Embodiment 13, wherein the first bonding material comprises a content of titanium of not greater than 30 wt % for a total weight of the first bonding material or not greater than 20 wt % or not greater than 18 wt % or not greater than 15 wt % or not greater than 12 wt % or not greater than 10 wt % or not greater than 8 wt % or not greater than 6 wt %.

Embodiment 26

The abrasive article of any one of Embodiments 1, 2, and 3, wherein the first bonding material is a braze.

Embodiment 27

The abrasive article of any one of Embodiments 1 and 3, wherein the abrasive particles have an average particle size (D50) of at least 500 microns.

Embodiment 28

The abrasive article of any one of Embodiments 2 and 27, wherein the abrasive particles have an average particle size (D50) of at least 525 microns or at least 550 microns or at least 575 microns or at least 600 microns or at least 625 microns or at least 650 microns or at least 675 microns or at least 700 microns or at least 750 microns, or at least 800 microns.

Embodiment 29

The abrasive article of any one of Embodiments 2 and 27, wherein the abrasive particles have an average particles size (D50) of not greater than 5 mm or not greater than 4 mm or not greater than 3 mm or not greater than 2 mm or not greater than 1.5 mm or 1.2 mm or 1.0 mm.

Embodiment 30

The abrasive article of any one of Embodiments 1, 2, and 3, wherein the abrasive particles comprise at least one of an oxide, carbide, nitride, boride, superabrasive or any combination thereof.

Embodiment 31

The abrasive article of any one of Embodiments 1, 2, and 3, wherein the abrasive particles comprise diamond.

Embodiment 32

The abrasive article of any one of Embodiments 1, 2, and 3, wherein the abrasive particles consist essentially of diamond.

Embodiment 33

The abrasive article of any one of Embodiments 1, 2, and 3, wherein the first bonding material comprises a filler selected from the group consisting of a particulate, a fiber, an inorganic material, or a combination thereof.

Embodiment 34

The abrasive article of Embodiment 33, wherein the filler comprises a wear resistant particle.

Embodiment 35

The abrasive article of Embodiment 33, wherein the filler comprises a material selected from the group consisting of tungsten, iron, titanium, diamond, a carbide, a nitride, a boride, an oxide, or any combination thereof.

Embodiment 36

The abrasive article of Embodiment 33, wherein the filler comprises an average particle size (D50f) that is less than the average particle size (D50) of the abrasive particles.

Embodiment 37

The abrasive article of Embodiment 36, further comprising a ratio [(D50f)/(D50)] of not greater than 0.99 or not greater than 0.9 or not greater than 0.8 or not greater than 0.7 or not greater than 0.6 or not greater than 0.5 or not greater than 0.4 or not greater than 0.3 or not greater than 0.2 or not greater than 0.1 or not greater than 0.08 or not greater than 0.05 or not greater than 0.02.

Embodiment 38

The abrasive article of Embodiment 37, wherein the ratio [(D50f)/(D50)] is at least 0.005 or at least 0.008 or at least 0.01 or at least 0.012 or at least 0.015 or at least 0.018 or at least 0.02 or at least 0.025 or at least 0.03 or at least 0.035 or at least 0.04 or at least 0.05 or at least 0.06 or at least 0.07 or at least 0.08 or at least 0.09 or at least 0.1 or at least 0.15 or at least 0.2 or at least 0.25.

Embodiment 39

The abrasive article of Embodiment 33, wherein the filler comprises an average particle size (D50f) of not greater than 10 microns or not greater than 8 microns or not greater than 6 microns or not greater than 4 microns or not greater than 2 microns or not greater than 1 micron or not greater than 0.8 microns or not greater than 0.5 microns.

Embodiment 40

The abrasive article of Embodiment 33, wherein the filler comprises an average particle size (D50f) or at least 0.01 microns or at least 0.05 microns or at least 0.08 microns or at least 0.1 micron or at least 0.2 microns or at least 0.5 microns or at least 0.8 microns or at least 1 micron or at least 2 microns or at least 3 microns or at least 5 microns.

Embodiment 41

The abrasive article of any one of Embodiments 1, 2, and 3, wherein the first bonding material comprises an average thickness of not greater than 50% of the average particles size (D50) of the abrasive particles or not greater than 45% or not greater than 40% or not greater than 35% or not greater than 30% or not greater than 25% or not greater than 20% or not greater than 10%.

Embodiment 42

The abrasive article of any one of Embodiments 1, 2, and 3, wherein the first bonding material comprises an average thickness of at least 10% of the average particles size (D50) of the abrasive particles or at least 20% or at least 30% or at least 40% or at least 50%.

Embodiment 43

The abrasive article of any one of Embodiments 1, 2, and 3, wherein the second bonding material comprising a metal and phosphorus.

Embodiment 44

The abrasive article of any one of Embodiments 1 and 43, wherein the second bonding material comprises a content of phosphorus of not greater than 10 wt % for a total weight of the second bonding material or not greater than 9 wt % or not greater than 8 wt % or not greater than 7 wt % or not greater than 6 wt % or not greater than 5 wt % or not greater than 4 wt % or not greater than 3 wt % or not greater than 2 wt % or not greater than 1 wt %.

Embodiment 45

The abrasive article of any one of Embodiments 1 and 43, wherein the second bonding material comprises a content of phosphorus of at least 0.1 wt % for a total weight of the second bonding material or at least 1 wt % or at least 2 wt % or at least 3 wt % or at least 4 wt % or at least 5 wt % or at least 6 wt % or at least 7 wt % or at least 8 wt %.

Embodiment 46

The abrasive article of any one of Embodiments 1, 2, and 3, wherein the second bonding material comprises a transition metal element.

Embodiment 47

The abrasive article of any one of Embodiments 1, 2, and 3, wherein the second bonding material comprises nickel.

Embodiment 48

The abrasive article of Embodiment 47, wherein the second bonding material comprises at least 50 wt % nickel for a total weight of the second bonding material or at least 60 wt % or at least 70 wt % or at least 80 wt % or at least 90 wt % or at least 95 wt %.

Embodiment 49

The abrasive article of Embodiment 47, wherein the second bonding material comprises not greater than 99 wt % nickel or not greater than 95 wt % or not greater than 93 wt % or not greater than 90 wt %.

Embodiment 50

The abrasive article of any one of Embodiments 1, 2, and 3, wherein the second bonding material comprises an average thickness of not greater than 40% of the average particles size (D50) of the abrasive particles or not greater than 35% or not greater than 30% or not greater than 25% or not greater than 20% or not greater than 15% or not greater than 12% or not greater than 10%.

Embodiment 51

The abrasive article of any one of Embodiments 1, 2, and 3, wherein the second bonding material comprises an average thickness of at least 5% of the average particles size (D50) of the abrasive particles or at least 8% or at least 10% or at least 15% or at least 20% or at least 25% or at least 30%.

Embodiment 52

The abrasive article of any one of Embodiments 1, 2, and 3, wherein the second bonding material comprises an average thickness not greater than an average thickness of the first bonding material.

Embodiment 53

The abrasive article of any one of Embodiments 1, 2, and 3, wherein the sum of the average thickness of the first bonding material and the average thickness of the second bonding material define an average total thickness, and wherein the average total thickness is not greater than 80% of the average particles size (D50) of the abrasive particles or not greater than 75% or not greater than 70% or not greater than 65% or not greater than 60% or not greater than 55% or not greater than 50%, or not greater than 45%, or not greater than 40%, or not greater than 35%.

Embodiment 54

The abrasive article of Embodiment 53, wherein the average total thickness is at least 25% of the average particles size (D50) of the abrasive particles or at least 30% or at least 35% or at least 40% or at least 50% or at least 60% or at least 70%.

Embodiment 55

The abrasive article of Embodiment 53, wherein the average total thickness is not greater than 500 microns or not greater than 450 microns or not greater than 400 microns or not greater than 350 microns or not greater than 300 microns or not greater than 250 microns.

Embodiment 56

The abrasive article of Embodiment 53, wherein the average total thickness is at least 100 microns or at least 200 microns or at least 250 microns or at least 300 microns or at least 350 microns.

Embodiment 57

The abrasive article of any one of Embodiments 1 and 2, wherein the second bonding material comprising an electroless plated material overlying the abrasive particles and first bonding material.

Embodiment 58

The abrasive article of Embodiment 57, wherein the second bonding material is an electroless plated nickel layer having a thickness of at least 10 microns, or at least 15 microns, or at least 20 microns, or at least 30 microns, or at least 40 microns, or at least 50 microns.

Embodiment 59

The abrasive article of Embodiment 57, wherein the second bonding material is an electroless plated nickel layer having a thickness of not greater than 150 microns, or not greater than 100 microns, or not greater than 80 microns, or not greater than 60 microns, or not greater than 50 microns.

Embodiment 60

The abrasive article of Embodiment 57, wherein the second bonding material is an electroless plated nickel layer having a Vickers hardness of at least 5.50 GPa, such as at least 5.8 GPa, or at least 6.0 GPa, or at least 6.2 GPa, or at least 6.4 GPa, or at least 6.5 GPa.

Embodiment 61

A method of forming an abrasive article comprising: depositing a layer of a first bonding precursor mixture on an exterior surface of a substrate; depositing abrasive particles on to the layer of the first bonding precursor mixture; forming a first bonding material by brazing the first bonding precursor mixture to the substrate; and electroless plating a second bonding material over at least portions of the first bonding material and the abrasive particles.

Embodiment 62

The method of Embodiment 61, wherein brazing comprises heating to a brazing temperature of at least 400° C., or at least 500° C., or at least 600° C., or at least 700° C., or at least 800° C.

Embodiment 63

The method of Embodiment 61, wherein brazing includes heating to a brazing temperature of not greater than 1000° C., or not greater than 950° C., or not greater than 900° C., or not greater than 850° C.

Embodiment 64

The method of Embodiment 61, wherein the braze material is a paste or tape comprising metal particles.

Embodiment 65

The method of Embodiment 61, wherein electroless plating comprises depositing of nickel, platinum, gold, chrome, copper, silver, rhodium, zinc, tin, cadmium.

Embodiment 66

The method of Embodiment 61, wherein electroless plating comprises electroless nickel plating.

Embodiment 67

The method of Embodiment 61, wherein a plating bath of the electroless nickel plating comprises a nickel salt, a phosphite salt, and a reducing agent.

Embodiment 68

The method of any one of Embodiments 61 to 67, wherein the second bonding material comprises nickel and phosphorus, and an amount of the phosphorus is at least 4 wt % and not greater than 10 wt % based on the total weight of the second bonding material.

Embodiment 69

The method of any one of Embodiments 61 to 68, wherein forming of the first bonding material includes providing a brazing paste, wherein the brazing paste comprises a prealloyed copper-tin powder and a titanium hydride powder.

EXAMPLES

Example 1

Preparing of Brazing Paste.

A prealloyed copper tin braze powder (77 wt % Cu—23 wt % Sn) having a size of −325/+400 mesh in an amount of 2182 g (72.7 wt %) was mixed together with 218 g (7.3 wt %) of a titanium hydride powder also having a mesh size of −325 in a plastic container.

In a stainless steel container, a binder was prepared by stirring together 90 g (3 wt %) of tripropylene glycol and 510 g (17 wt %) of Vita-Gel binder. Thereafter, the powder mixture was combined with the binder and mixed in a rotating paint shaker for about 20 minutes. The braze paste was filled into 6 oz cartridges and kept air tight to prevent drying until use.

Example 2

Manufacturing of Abrasive Wheel.

A round steel substrate with a diameter of 150 cm was surface pretreated by sandblasting and washed with acetone.

Thereafter, a 1 mm thick layer of the brazing paste of Example 1 was evenly applied on the pretreated surface of the steel substrate. The brazing paste (also called first bonding precursor mixture herein) was applied to the upper surface of the steel substrate by filling the space within the substrate surface and a brazing template positioned above the substrate surface at a height comparative to the thickness of the paste to be applied, while the lathe was slowly turning.

Thereafter, the brazing template was removed and coarse diamond particles having an average particle size of 852 microns and a particle distribution between 601 microns to 1001 microns (Element 6 from De Beers Group) were evenly deposited over the applied brazing paste layer while slowly rotating the wheel. The amount of diamond particles deposited on the brazing paste was 0.14 g/cm². The applied brazing paste (i.e., first bonding precursor mixture) was dried at a temperature of 20° C. to 23° C. for about 12 hours.

After drying, the wheel was subjected to a heat treatment regime in a furnace under vacuum (non-oxidizing condition), as summarized in Table 1.

During the heat treatment regime (brazing), the metal filler of the brazing paste partially melted and densified and thereby adhered the diamond particles to the steel surface.

After the heat treatment regime, the wheel surface was cleaned from any lose particles.

As used herein, an abrasive article containing a metal support, a brazing layer and diamond particles attached via the brazing layer to the metal support, as described above, is called a MSL (metal single layer) bonded article.

TABLE 1

| Temperature regime during brazing | | |
|---|---|---|
| | Target[° C.] | Ramp Speed and Holding Time |
| Holding | 71 | 0:00:20 |
| Ramp | 177 | 5.6 |
| Holding | 177 | 0:20:00 |
| Ramp | 443 | 5.5 |
| Holding | 443 | 0:00:30 |
| Ramp | 471 | 0.6 |
| Holding | 471 | 0:00:30 |
| Ramp | 700 | 8.8 |
| Holding | 700 | 0:20:00 |
| Ramp | 865 | 8.7 |
| Holding | 865 | 0.041 |
| Ramp | 82 | 43.5 |
| Holding | 82 | 0:00:30 |
| Step | 49 | Free cooling |
| Holding | 49 | 0:01:00 |

After the brazing, a second bonding material was applied over the first bonding material and diamond particles (MSL wheel) by electroless nickel plating. The electroless nickel plating was conducted by placing the wheel after the brazing in a plating bath including a nickel salt, a phosphite salt, and a reducing agent (MetaPlate 6000 from MetalChem). The temperature of the plating bath was about 90° C., and the electroless plating was conducted for about 120 minutes in order to deposit a nickel layer of about 50 microns thickness and a phosphorous content of 7-8 wt % on top of the brazed layer and the diamond particles.

Figure 3:
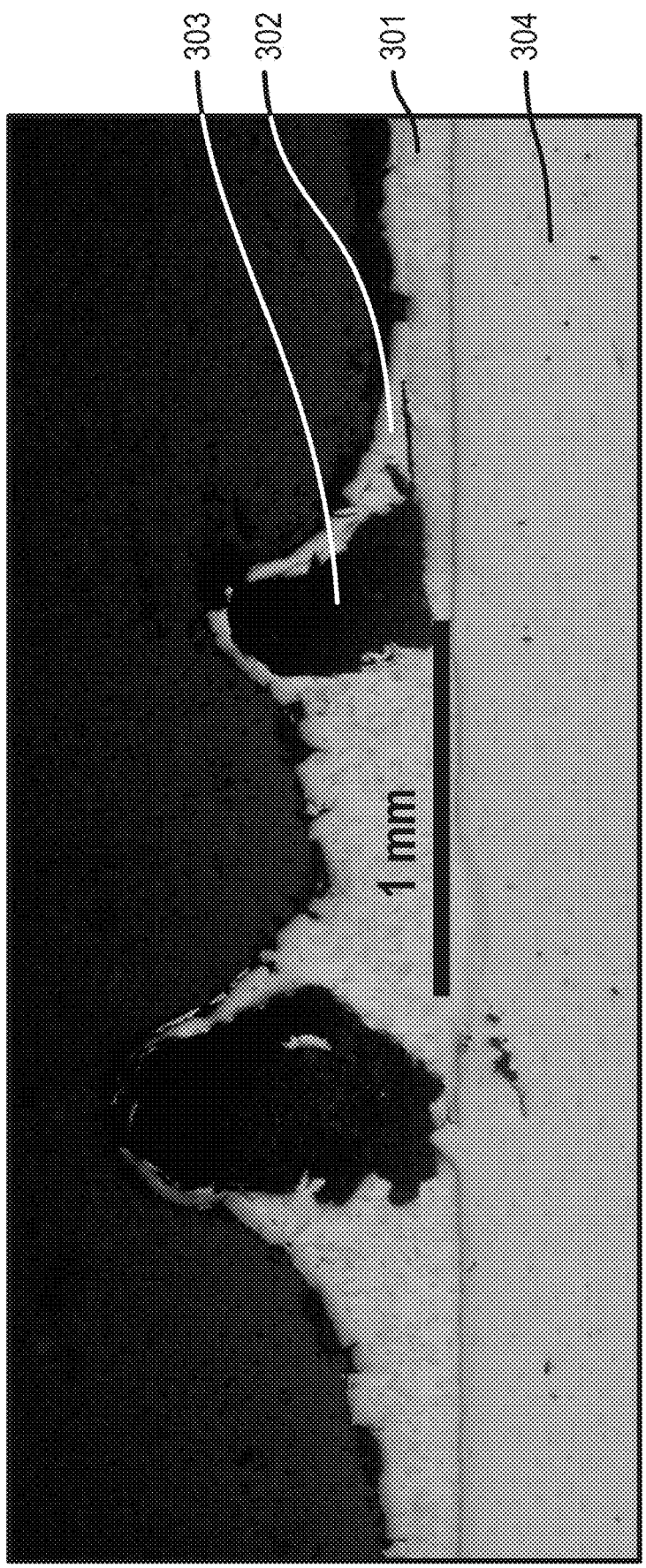
FIG. 3 is an optical microscope image of a cross cut of an abrasive article according to one embodiment.

An optical microscope image of a 50 times magnified cross-cut of the manufactured abrasive wheel can be seen in FIG. 3. The average thickness of the first bonding material (301) was about 300 microns, and the thickness of the second bonding material (302) was about 55 microns, which corresponds to a calculated average total thickness of layers (301) and (302) in relation to the average size of the diamond particles (852 microns) of 41.5%. The diamond particles (303) were strongly fixed to the steel support (304) and partially surrounded by the first bonding material (301) and the second bonding material (302). The electroless nickel plated MSL wheel is hereinafter called EN-MSL wheel.

Example 3

Wear Performance.

The wear performance of different types of surface layers was measured with a plint tester (TE 77 High Frequency Friction Machine) according to ASTM G133-05(2016) at ambient temperature (22±3° C.) without lubrication at varying force loads. Sample 1 (S1) was a 100 microns thick electroless plated nickel layer with a phosphorous content of about 8 wt % deposited on a 2 mm thick steel plate; Sample 2 (S2) was a 250 microns thick bronze layer brazed on a 2 mm thick steel plate, and Sample 3 (S3) was a 250 microns thick bronze layer brazed on a 2 mm thick steel plate, wherein the bronze layer of S3 was further subjected to oxidizing conditions by treatment at 600° C. for 1 hour in an oven (with normal air).

Figure 4:
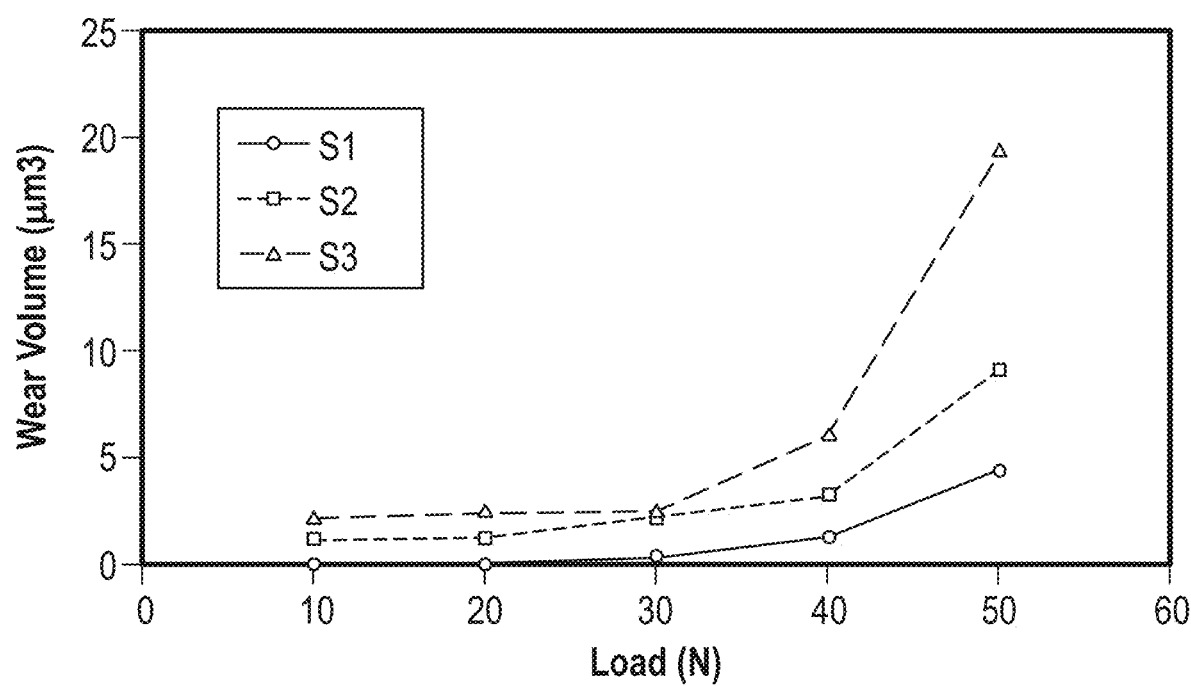
FIG. 4 includes a graph illustrating wear testing results of different materials.

The test results are illustrated in FIG. 4. It can be seen that the electroless nickel plated layer (S1) had a much higher wear resistance than the bronze layer (S2) or the oxidized bronze layer (S3). At loads between 10 and 30 Newton, nearly no electroless plated nickel was lost, and also at 50 Newton the material loss during the wear exposure maintained below 5 μm³. A much higher material loss, corresponding to a much lower wear resistance, was observed with samples S2 and S3.

Example 4

Differential Scanning Calorimetry (DSC) Test Over Large Temperature Range.

Figure 5:
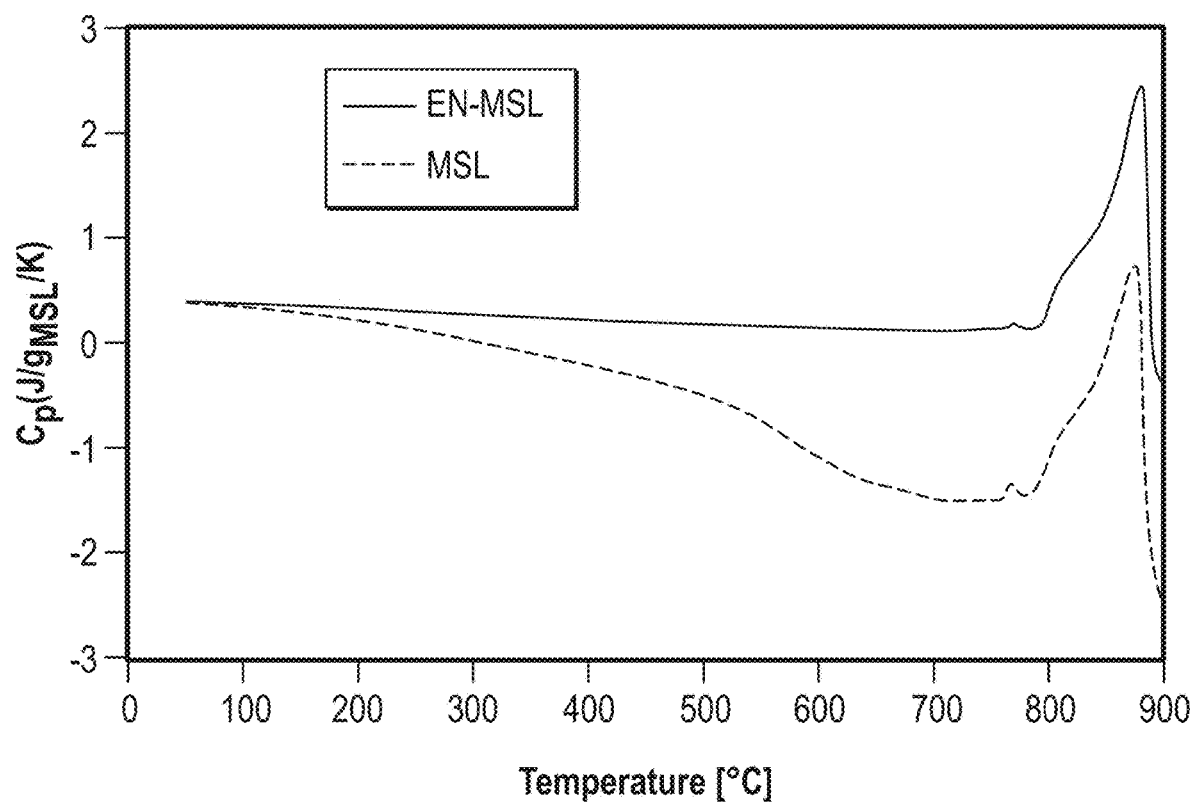
FIG. 5 includes a graph illustrating Differential Scanning calorimetry (DSC) tests over a large temperature range of an abrasive article according to one embodiment and of a comparative abrasive article.

A sample of the EN-MSL wheel as produced in Example 2 was subjected to DSC testing over a temperature range from 25° C. to 900° C., with a temperature increase of 20° C./min, and an air flow of 100 ml/minute. As illustrated in FIG. 5, it can be seen that until the melt peak between 800° C. and 900° C., the EN-MSL sample did not loose any weight, which is an indication that the electroless nickel layer (EN) protected very well the underneath lying MSL material. In contrast, if an MSL wheel sample without EN layer was subjected to the same DSC test, a loss of material was observed beginning at a temperature of about 150° C., and reached the highest loss between 650° C. and 800° C. The DSC comparison of the EN-MSL sample and the MSL sample demonstrated that the electroless nickel layer can very well protect the underneath lying MSL layer and thereby reduce the degree of MSL oxidation and degradation when exposed to heat during grinding.

Example 5

Simulation of Heat Transfer During Grinding.

Heat transfer simulations were conducted to investigate the influence of an electroless nickel plated (EN) layer covering a MSL layer in an EN-MSL wheel with regard to the protection of the MSL against heat during a grinding operation. For the simulations, "ANSYS Fluent" software was used, and standard form and finish grinding heat partitioning rules were implemented to determine both the heat generated at the interface of the wheel and workpiece and the magnitude of fluxes into the different material types, as also described in "Principles of Abrasive Processing," Milton C. Shaw, Oxford Series on Advanced Manufacturing, 1996. The thermal effusivities (which guide the partitioning of heat between the workpiece and surface of the wheel) were determined experimentally for the electroless nickel plated layer and the MSL layer. The thermal effusivity value for the workpiece was obtained from literature.

The following assumptions were made: a 12 inch diameter wheel made of cast iron; a speed of 5000 RPM; a 100 microns thick MSL layer; an electroless plated nickel (EN) layer with a phosphorous contents of 8 wt %, and the material of the workpiece being cast iron. The simulations were conducted for 4 different thicknesses of the EN layer: 40 microns, 30 microns, 20 microns, and 10 microns.

Figure 6A:
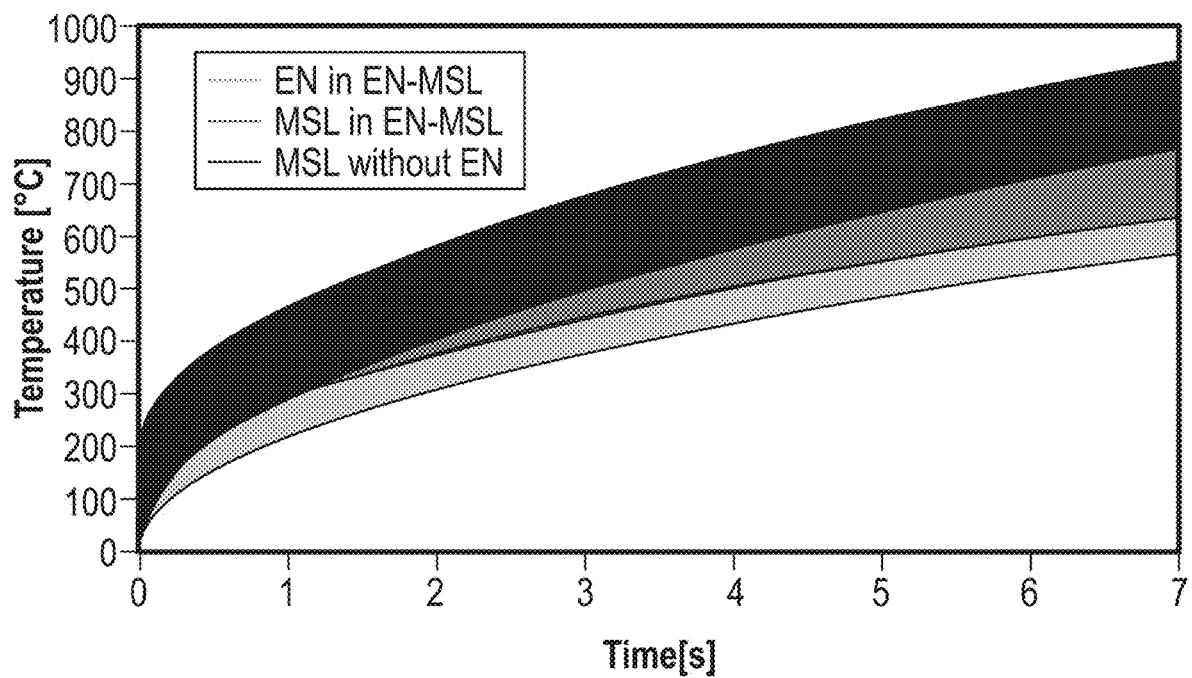
FIG. 6A includes a graph illustrating the temperature increase during grinding in an EN-MSL wheel according to one embodiment in comparison to an MSL wheel.
Figure 6B:
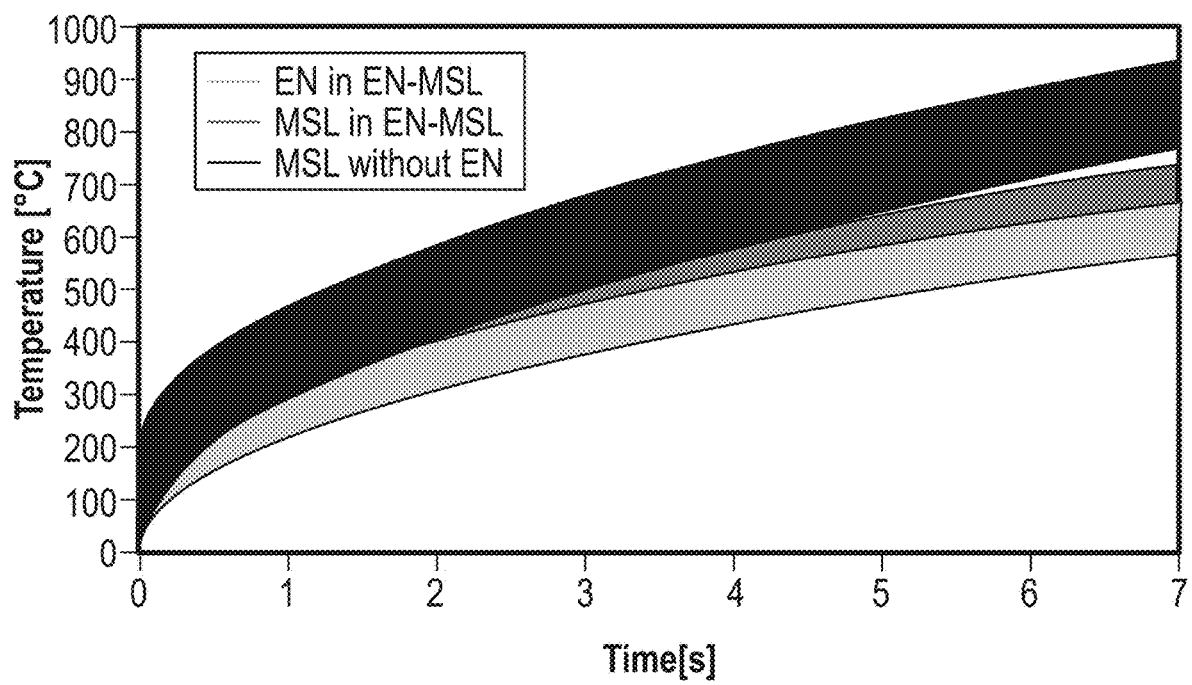
FIG. 6B includes a graph illustrating the temperature increase during grinding in an EN-MSL wheel according to one embodiment in comparison to an MSL wheel.

FIGS. 6A and 6B illustrate the temperature increase with the grinding time for the layers of the EN-MSL wheel (specifically the MSL layer and the EN layer), in comparison with the temperature increase of an MSL layer having no protective overlying EN layer. The temperature variations (variation in the y direction) shown in FIGS. 6A and 6B corresponds to the change in temperature ($T_{min}$ to $T_{max}$) during one wheel rotation.

In FIG. 6A, the thickness of the EN layer was 40 microns, and in FIG. 6B, the thickness of the EN layer was reduced by 50 percent to 20 microns.

It can be seen that the EN layers provided a good shield against heat to the underlying MSL layers, for both, the 40 microns and 20 microns thick EN layers. In contrast, the MSL layer in the wheel not containing a protective EN layer had a much higher temperature increase with the grinding time. In FIGS. 6A and 6B, a certain minor overlapping of the temperature ranges is not graphically shown. In order to demonstrate an exact comparison of the temperature differences in each layer, the data for $T_{min}$-$T_{max}$ at 4 seconds and at 7 second grinding time are shown in Tables 2 and 3.

TABLE 2

| | $T_{min}$-$T_{max}$ after 4 seconds grinding [° C.] Thickness of EN layer [microns] | | | |
|---|---|---|---|---|
| | 40 | 30 | 20 | 10 |
| MSL (no EN) | 578-753 | 578-753 | 578-753 | 578-753 |
| EN in EN-MSL | 433-623 | 433-617 | 434-606 | 437-590 |
| MSL in EN-MSL | 433-501 | 433-514 | 434-529 | 437-545 |

TABLE 3

| | $T_{min}$-$T_{max}$ after 7 seconds grinding [° C.] Thickness of EN layer [microns] | | | |
|---|---|---|---|---|
| | 40 | 30 | 20 | 10 |
| MSL (no EN) | 763-938 | 763-938 | 763-938 | 763-938 |
| EN in EN-MSL | 569-757 | 572-753 | 570-742 | 569-723 |
| MSL in EN-MSL | 569-638 | 572-651 | 570-666 | 569-682 |

The data in Tables 2 and 3 show that all EN layers could provide a large heat shield towards the underneath lying MSL layer. Not unexpected, the 40 microns thick EN layer provided the best heat protection, however, even at 10 microns thickness of the EN layer, the temperature in the EN protected MSL layer (MSL in EN-MSL) was still about 100° C. lower than the temperature in the corresponding MSL layer without a protective EN layer (MSL—no EN). Simulations were further conducted to evaluate how even the EN layer can be applied in comparison to forming an electroplated nickel layer (EP). The simulations assumed a 40 microns thick nickel layer deposited on a 100 microns thick MSL layer on a steel support. For the electroless nickel plated layer (EN), the standard deviation of the layer thickness was ±2.8 microns, while the standard deviation for the electroplated nickel layer (EP) was ±11.6 microns. The much larger standard deviation in the thickness of the EP layer has its cause in the nature of the EP process. The EP process depends on the local current density of the part to be coated, which is variable depending on the part geometry, distance to anode and nickel ion flow.

Example 6

Dry Grinding Performance.

Figure 7A:
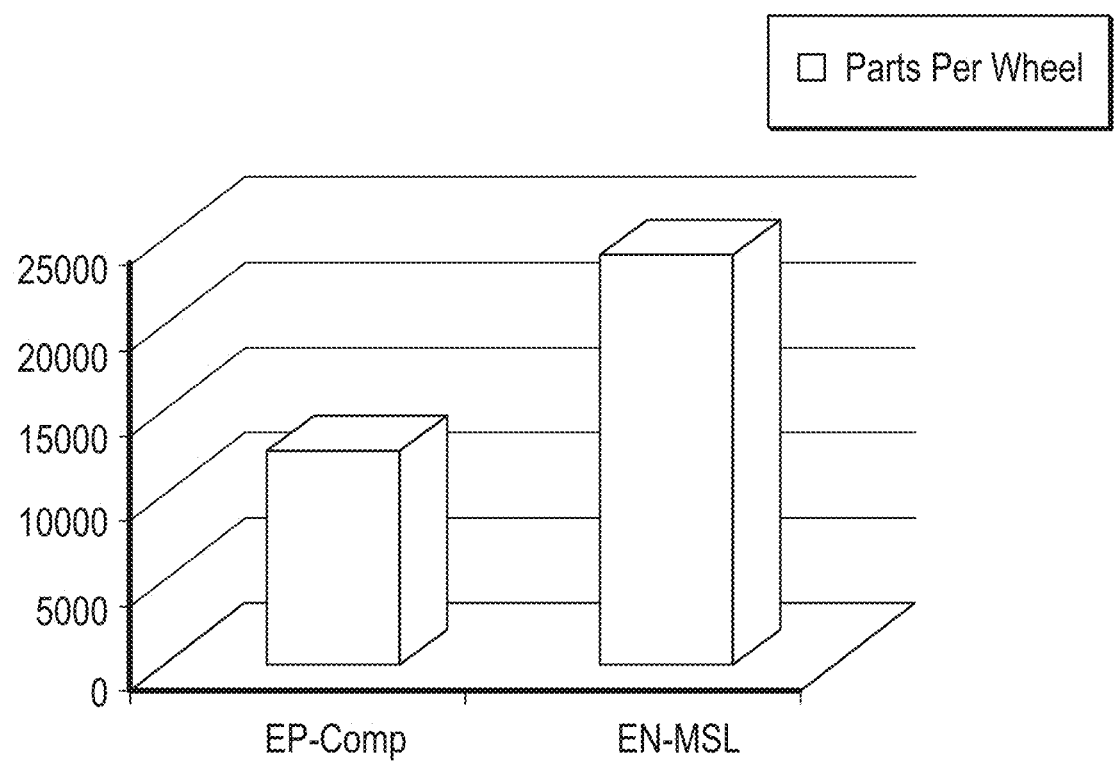
FIG. 7A includes a graph illustrating the grinding performance of an abrasive article according to one embodiment and of a comparative abrasive article.

An abrasive EN-MSL wheel with an outer diameter of 14 inches was prepared similarly as in Example 2, and used for dry grinding ductile cast iron parts at a wheel speed of 10,000 to 14,000 SFPM, and a feed rate of 31 IPM. The grinding performance of the EN-MSL wheel was compared with the performance of a nickel electroplated commercial grinding wheel, wherein the diamond particles were attached to the steel support with an electroplated nickel layer (EP-Comp). As illustrated in FIG. 7A, the EN-MSL wheel was able to grind about 22,000 parts, while the comparative grinding wheel only reached about 11,000 parts during its life time (all parts were subjected to the same type of grinding/material removal).

Not being bound to theory, an explanation for the high grinding performance of the EN-MSL wheel can be that a larger area of the grains was available for grinding. The structure of combining a braze layer and a thin electroless plated nickel layer allowed a strong hold of the diamond particles and at the same time a larger exposure of the abrasive diamond particles.

Figure 7B:
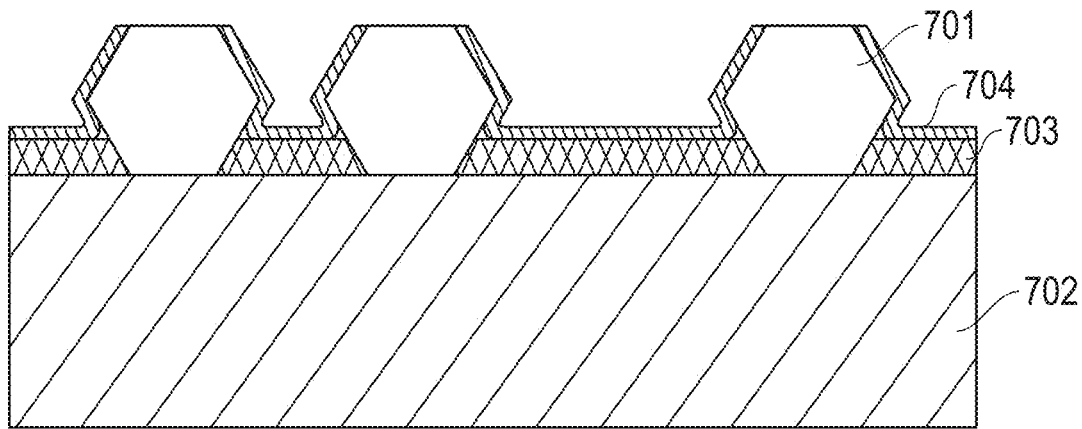
FIG. 7B includes a drawing illustrating a cross-section of a portion of an abrasive article according to one embodiment.
Figure 7C:
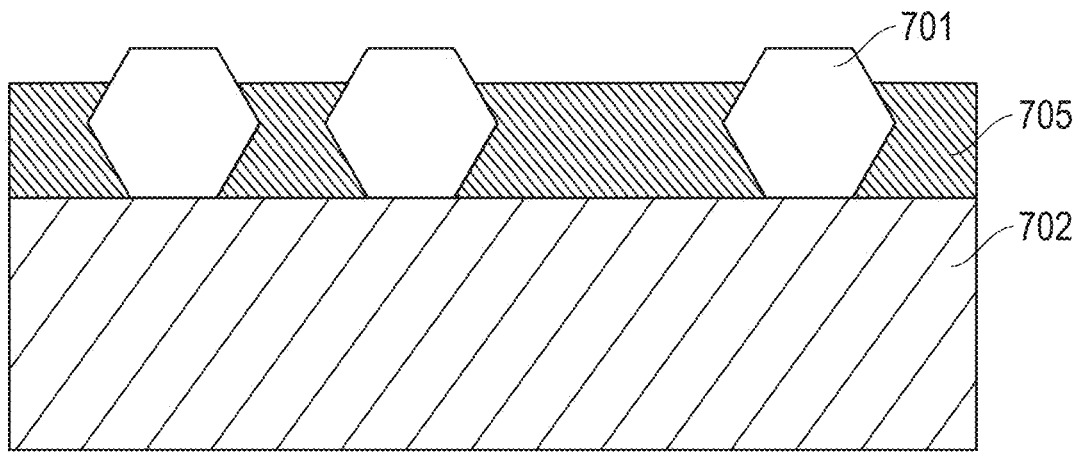
FIG. 7C includes and illustration illustrating a cross-section or a portion of an abrasive article of a comparative abrasive article.

The two wheel structures used in Example 6 are illustrated in FIGS. 7B and 7C. FIG. 7B illustrates a cross-section of an EN-MSL wheel, wherein the abrasive particles (701) are attached to the steel support (702) by a braze layer (703) and an electroless plated nickel layer (704), and a large portion of the abrasive diamond particles is exposed and available for the grinding operation. The at least partial coating of the exposed portions of the abrasive particles with the thin EN coating (704) can be easily removed during the grinding operation. In FIG. 7C, the diamond particles (701) are to a major part embedded in an electroplated nickel layer (705), wherein the electroplated nickel layer provides a mechanical hold of the abrasive particles (701) to the steel support (702).

A further advantage of the EN layer in comparison to an electroplated nickel layer (EP) can be the high hardness that may be achieved with EN plating. While the tested Vickers hardness of the EN layer (in EN-MSL) was 6.56±0.30 GPa, the hardness of EP layers are typically lower, and was measured in samples between 4.95 GPa and 5.29 GPa. The Vickers hardness was measured according to ASTM E92-17.

The foregoing embodiments are directed to bonded abrasive products, and particularly grinding wheels, which represent a departure from the state-of-the-art.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An abrasive article comprising:
a substrate;
a first bonding material comprising metal overlying the substrate;
abrasive particles overlying the substrate and coupled to the first bonding material; and
a second bonding material comprising a metal and phosphorus and overlying at least a portion of the first bonding material,
wherein the first bonding material is a braze, and wherein a sum of the average thickness of the first bonding material and of the average thickness of the second bonding material define an average total thickness, and wherein the average total thickness is at least 25% and not greater than 60% of the average particle size of the abrasive particles.

2. The abrasive article of claim 1, wherein the first bonding material is in form of a layer overlying an exterior surface of the substrate.

3. The abrasive article of claim 1, wherein the first bonding material comprises tin, copper, titanium, silver, tungsten, iron, nickel chrome, or any combination thereof.

4. The abrasive article of claim 3, wherein the first bonding material comprises tin, copper and titanium.

5. The abrasive article of claim 1, wherein the abrasive particles have an average particle size (D50) of at least 500 microns.

6. The abrasive article of claim 1, wherein the abrasive particles comprise an oxide, a carbide, a nitride, boride, diamond, or any combination thereof.

7. The abrasive article of claim 1, wherein the abrasive particles consist essentially of diamond.

8. The abrasive article of claim 1, wherein the second bonding material includes an electroless plated material comprising nickel and phosphorus.

9. The abrasive article of claim 1, wherein a content of phosphorus in the second bonding material is at least 1 wt % and not greater than 10 wt % based on the total weight of the second bonding material.

10. The abrasive article of claim 1, wherein the content of phosphorus is at least 5 wt % and not greater than 9 wt % based on the total weight of the second bonding material.

11. An abrasive article comprising:
a substrate;
a first bonding material comprising metal overlying the substrate;
abrasive particles overlying the substrate and coupled to the first bonding material; and
a second bonding material comprising a metal and phosphorus and overlying at least a portion of the first bonding material,
wherein the first bonding material is a braze, and wherein an average thickness of the first bonding material is not greater than 50% of the average particle size (D50) of the abrasive particles.

12. The abrasive article of claim 1, wherein an average thickness of the second bonding material is at least 10 microns and not greater than 80 microns.

13. The abrasive article of claim 1, wherein the second bonding material is an electroless plated nickel layer having a Vickers hardness of at least 5.80 GPa.

14. An abrasive article comprising:
a substrate;
a first bonding material comprising metal overlying the substrate;
abrasive particles overlying the substrate and coupled to the first bonding material; and
a second bonding material comprising a metal and phosphorus and overlying at least a portion of the first bonding material,
wherein the first bonding material is a braze, and wherein the second bonding material has an average thickness not greater than an average thickness of the first bonding material, and the average thickness of the second bonding material is at least 30 microns.

15. The abrasive article of claim 11, wherein the first bonding material is in form of a layer overlying an exterior surface of the substrate.

16. The abrasive article of claim 11, wherein the first bonding material comprises tin, copper and titanium.

17. The abrasive article of claim 11, wherein the abrasive particles have an average particle size (D50) of at least 500 microns.

18. The abrasive article of claim 11, wherein the abrasive particles consist essentially of diamond.

19. The abrasive article of claim 11, wherein the second bonding material includes an electroless plated material comprising nickel and phosphorus.

20. The abrasive article of claim 19, wherein the content of phosphorus is at least 1 wt % and not greater than 10 wt % based on the total weight of the second bonding material.

* * * * *